United States Patent [19]
Li et al.

[11] Patent Number: 5,689,427
[45] Date of Patent: Nov. 18, 1997

[54] METHOD AND APPARATUS FOR OPTIMAL FEEDRATE CONTROL ON WIRE-CUTTING ELECTRIC DISCHARGING MACHINE (WEDM)

[75] Inventors: Hsi-Pin Li, Hsin Ying; Hsin-Jung Chuang; Tsuen-Pann Shieh, both of Hsinchu, all of Taiwan

[73] Assignee: Industrial Technology Research Institute, Hsinchu, Taiwan

[21] Appl. No.: 522,900

[22] Filed: Sep. 1, 1995

[51] Int. Cl.⁶ .............................. B23H 1/00; B23H 7/30
[52] U.S. Cl. ................ 364/474.04; 318/571; 219/69.12
[58] Field of Search .......................... 364/483, 486, 364/489, 474.04, 166, 174, 565, 474.01; 318/571; 219/69.11, 69.12, 69.13, 69.16, 69.17, 69.18

[56] References Cited

U.S. PATENT DOCUMENTS

| | | |
|---|---|---|
| 4,366,359 | 12/1982 | Yatomi et al. ............ 219/69 M |
| 4,582,974 | 4/1986 | Itoh .......................... 219/69 C |
| 4,703,144 | 10/1987 | Goto et al. ................ 219/69 P |
| 5,276,301 | 1/1994 | Kohsaka et al. .......... 219/69.12 |
| 5,360,957 | 11/1994 | Haefner et al. ........... 219/69.16 |
| 5,428,201 | 6/1995 | Kaneko et al. ........... 219/69.16 |
| 5,545,870 | 8/1996 | Fujii et al. ............... 219/69.13 |
| 5,598,075 | 1/1997 | Liang et al. .............. 318/571 |

*Primary Examiner*—Emanuel T. Voeltz
*Assistant Examiner*—Tony M. Cole
*Attorney, Agent, or Firm*—W. Wayne Liauh

[57] ABSTRACT

Disclosed is a feedrate controlling method and apparatus for controlling a wire-cutting electric discharging machine (WEDM) to operate at optimal feedrate. In the apparatus, a discharge frequency counter is used to count the frequency of normal discharge and the frequency of abnormal discharge, from which two performance indexes: stability percent (STB) and efficiency percent (EFF) are obtained. These two performance indexes allow the apparatus to use a decision table to obtain an optimal feedrate variation used to change the current feedrate so as to operate the WEDM with maximum stability and efficiency.

6 Claims, 3 Drawing Sheets

| EFF% \ ΔF% \ STB% | HIGH | INTERMEDIATE HIGH | INTERMEDIATE | INTERMEDIATE LOW | LOW |
|---|---|---|---|---|---|
| HIGH | ΔF1 | ΔF6 | ΔF11 | ΔF16 | ΔF21 |
| INTERMEDIATE HIGH | ΔF2 | ΔF7 | ΔF12 | ΔF17 | ΔF22 |
| INTERMEDIATE | ΔF3 | ΔF8 | ΔF13 | ΔF18 | ΔF23 |
| INTERMEDIATE LOW | ΔF4 | ΔF9 | ΔF14 | ΔF19 | ΔF24 |
| LOW | ΔF5 | ΔF10 | ΔF15 | ΔF20 | ΔF25 |

```
Counting frequency of normal discharge (fnormal)
and frequency of abnormal discharge (fabnormal)
          │
          ▼
Calculating the value of stability percent (STB)
          │
          ▼
Calculating the value of efficiency percent (EFF)
          │
          ▼
Obtaining a value of feedrate variation
          │
          ▼
Adjusting current feedrate of the WEDM
```

Fig. 5

METHOD AND APPARATUS FOR OPTIMAL FEEDRATE CONTROL ON WIRE-CUTTING ELECTRIC DISCHARGING MACHINE (WEDM)

BACKGROUND OF THE INVENTION

1. Field of the Invention:

The present invention relates to wire-cutting electric discharging machine (WEDM), and more particularly, to a feedrate controlling method and apparatus for controlling a WEDM to operate at optimal feedrate.

2. Description of Prior Art:

In WEDMs, servo feedrate control is directed to control the discharge gap that affects the speed and precision of the machining. FIG. 1 shows a schematic block diagram of a prior art WEDM servo feed control system. In the system, a gap voltage detector 3 is used to detect the average gap voltage $V_g$ which is subsequently compared in controller 1 with a reference voltage $V_s$ and a preset short-circuit reference voltage $V_r$, where $0 \leq V_r \leq V_s$, to determine the output F that is used to control the feedrate of the WEDM 2. The output F is determined in accordance with follows:

(a) if $V_g \geq V_s$, then $F = K^*(V_g - V_s)$, where K=servo gain and is a constant;

(b) if $V_r < V_g < V_s$, then F=0; and (c) if $V_g < V_r$, then F=−C, where C is a constant, indicating that the system withdraws knife with constant speed. FIG. 2 shows a graph of F versus $V_g$ with reference to $V_s$ and $V_r$.

It is a drawback of the aforementioned prior art WEDM servo feed control system that the system can provide stable operation and result only when satisfactory operating conditions as the on/off time of the discharge, water pressure (used for insulation, drainage of wastes, and cooling) are well provided. Otherwise, abnormal discharge or inappropriate feed would occur in the WEDM. Besides unsatisfactory operating conditions, the change in material or thickness of the working piece would also allow the problem to occur. There exists therefore a need for a servo feed control system that can provide precise machining result even in the aforementioned unsatisfactory operating conditions.

SUMMARY OF THE INVENTION

It is therefore a primary objective of the present invention to provide a novel WEDM servo feed control method and apparatus that can provide appropriate feedrate based on detected condition of the discharge.

In accordance with the foregoing and other objectives of the present invention, there is provided with a novel method and apparatus for controlling the feedrate of a WEDM. The method comprises the following steps of: (1) counting frequency of normal discharge ($f_{normal}$) and frequency of abnormal discharge ($f_{abnormal}$); (2) calculating for the value of stability percent (STB) in accordance with the following equation:

$$STB = \left[ 1 - \frac{|arc\%[k] - arc\%[k-1]|}{arc\%[k]} \right] * 100\%$$

wherein [k] denotes the (k)th sampling, and $$arc\% = \frac{f_{abnormal}}{f_{normal} + f_{abnormal}}$$

(3) calculating for the value of efficiency percent (EFF) in accordance with the following equation:

$$EFF = \frac{f_{normal} * t_{off} + f_{abnormal} * t_{ab-off}}{\tau * 10^6} * 100\%$$

wherein $t_{off}$=idle period during normal discharge (unit: μs),
$t_{ab-off}$=idle period during abnormal discharge (unit: μs),
τ=sampling period (unit: sec), and $0 < \tau \leq 2$;

(4) obtaining a value of feedrate variation ΔF% selected from a decision table of predetermined values mapped by the STB and EFF values; and (5) adjusting current feedrate of the WEDM by a variation equal to the selected value of ΔF%.

In preferred embodiment, the STB value is quantized into five levels: HIGH, INTERMEDIATE HIGH, INTERMEDIATE, INTERMEDIATE LOW, and LOW levels; and also the EFF value is quantized into five levels: HIGH, INTERMEDIATE HIGH, INTERMEDIATE, INTERMEDIATE LOW, and LOW levels. Therefore, a total of 25 combinations of STB and EFF levels are available. Accordingly, the decision table consists of a total of 25 values of ΔF% each of which is mapped to by a combination of the STB and EFF values. The obtained value of ΔF% can then be used to vary the current feedrate of the WEDM.

BRIEF DESCRIPTION OF DRAWINGS

The present invention can be more fully understood by reading the subsequent detailed description of the preferred embodiments thereof with references made to the accompanying drawings, wherein:

FIG. 5 is a schematic flowchart showing the main steps of the method disclosed in the present invention.

DETAILED DESCRIPTION OF PREFERRED EMBODIMENT

Figures 3, 4:
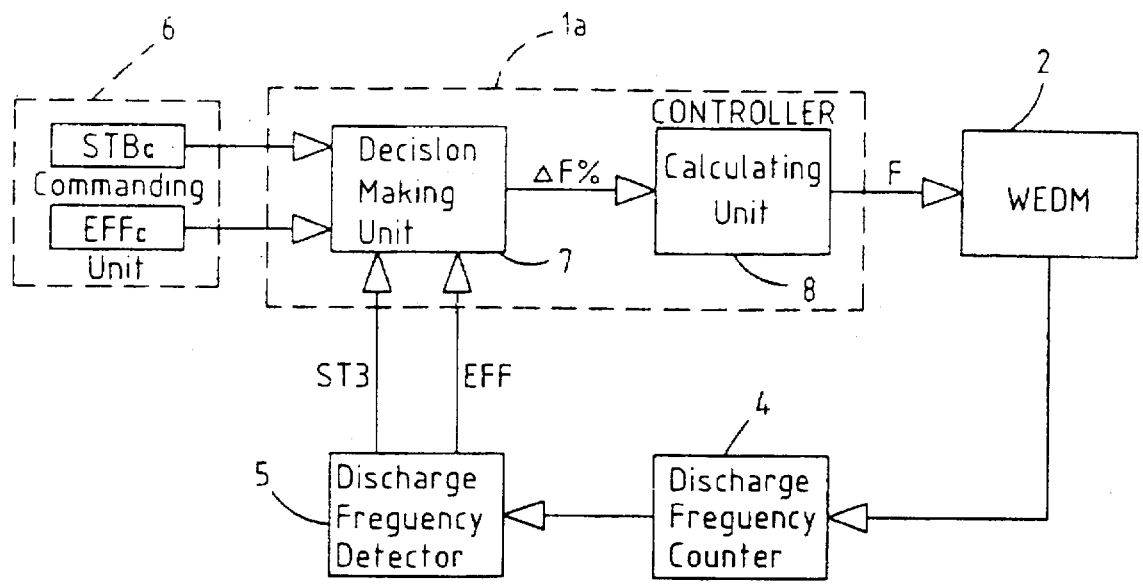
FIG. 3 shows a schematic block diagram of a WEDM servo feedrate control apparatus according to the present invention.
FIG. 4 shows a decision table used by the method and apparatus of the present invention to obtain a variation value for varying the feedrate ΔF% of the WEDM.

Referring to FIG. 3, there is shown a schematic block diagram of the WEDM servo feedrate control apparatus according to the present invention used to control the feedrate of a WEDM 2a. The servo feedrate control system used to control the WEDM 2a is composed of a controller 1a including a decision making unit 7 and a calculating unit 8, a discharge frequency counter 4, a discharge frequency detector 5, and a commanding unit 6. In the WEDM 2a, the condition of the discharge is judged to be "normal" if the discharge takes place after a presetted ignition time; otherwise in the event of an arc discharge or short-circuited discharge, it is judged to be "abnormal". This can be used as a basis for the adjustment of the cutting speed of the WEDM.

A discharge frequency counter 4 is used to count the number of normal and abnormal discharges $f_{normal}$ and $f_{abnormal}$. These two pieces of data can then be processed by a discharge frequency detector 5 to obtain two output values STB and EFF in accordance with the following equations:

(1) STB (Stability Percent)

$$STB = \left[ 1 - \frac{|arc\%[k] - arc\%[k-1]|}{arc\%[k]} \right] * 100\%$$

wherein [k] denotes the (k)th sampling, and $$arc\% = \frac{f_{abnormal}}{f_{normal} + f_{abnormal}}$$

If STB<0, STB=0 is used.

(2) EFF (Efficiency Percent)

$$EFF = \frac{f_{normal} * t_{off} + f_{abnormal} * t_{ab-off}}{\tau * 10^6} * 100\%$$

wherein $t_{off}$=idle period during normal discharge (unit: μs)
$t_{ab-off}$=idle period during abnormal discharge (unit: μs)
$\tau$=sampling period (unit: sec), and $0<\tau\leq 2$ The discharge frequency detector 5 detects the STB and EFF values in a period $\tau$ sec. ($\tau$=1 or 0.1). With each sampling of the STB and EFF values, the corresponding value for the feedrate variation $\Delta F\%$ is obtained by the decision making unit 7 in the controller 1a in accordance with a criteria table shown in FIG. 4.

In determining the optimal feedrate for the WEDM, a reference value of STBc and a reference value of EFFc are preset in the commanding unit 6. If the detected STB and EFF values are respectively equal to STBc and EFFc, no change will be made to the feedrate. On the other hand, if detected STB value is low while detected EFF value is high, it implies that the feedrate should be decreased; whereas if detected EFF value is low while detected STB value is high, it implies that the feedrate should be increased.

Based on the foregoing principle, a decision table as illustrated in FIG. 4 is proposed, in which the STB and EFF values are each quantized into five levels: "HIGH", "INTERMEDIATE HIGH", "INTERMEDIATE", "INTERMEDIATE LOW", and "LOW". Therefore, in combination there are in total 25 decision rule, and for each rule, a unique, predetermined value of $\Delta F\%$ (denoted by $\Delta F_1$ to $\Delta F_{25}$ in the table) can be correspondingly obtained. The $\Delta F\%$ values ($\Delta F_1$–$\Delta F_{25}$) are each determined in such a way as to allow the WEDM to reach at the target region of HIGH stability and HIGH efficiency as quickly as possible (under the condition that there are no short-circuit or wire-rupture occurred). In this region, $\Delta F\%$=0, i.e., $\Delta F_1$=0.

In the region where stability level is HIGH and efficiency level is LOW, which indicates that the discharge is stable but the machining process proceeds slowly, $\Delta F\%$ is assigned with the maximum value. When the efficiency level is rising, the $\Delta F\%$ value is decreased so as to avoid serious overshooting that would cause short-circuit or wire-rupture. All the $\Delta F\%$ values can be obtained in a similarly way.

On the other hand, in the region where stability is LOW and efficiency level is above INTERMEDIATE HIGH, which indicates that the WEDM is under unstable condition, it is desired that the speed is lowered. Accordingly, the $\Delta F\%$ value is assigned with the minimum value (which is a negative value).

From the above, it can be concluded that in the table of FIG. 4, the $\Delta F\%$ values in the same row are decreased from left to right and those in the same column are decreased from bottom to top. For example, in the first row 66 $F_1>\Delta F_6>\Delta F_{11}>\Delta F_{16}>\Delta F_{21}$ and in the first column $\Delta F_5>\Delta F_4>\Delta F_3>\Delta F_2>\Delta F_1$.

Figure 1:
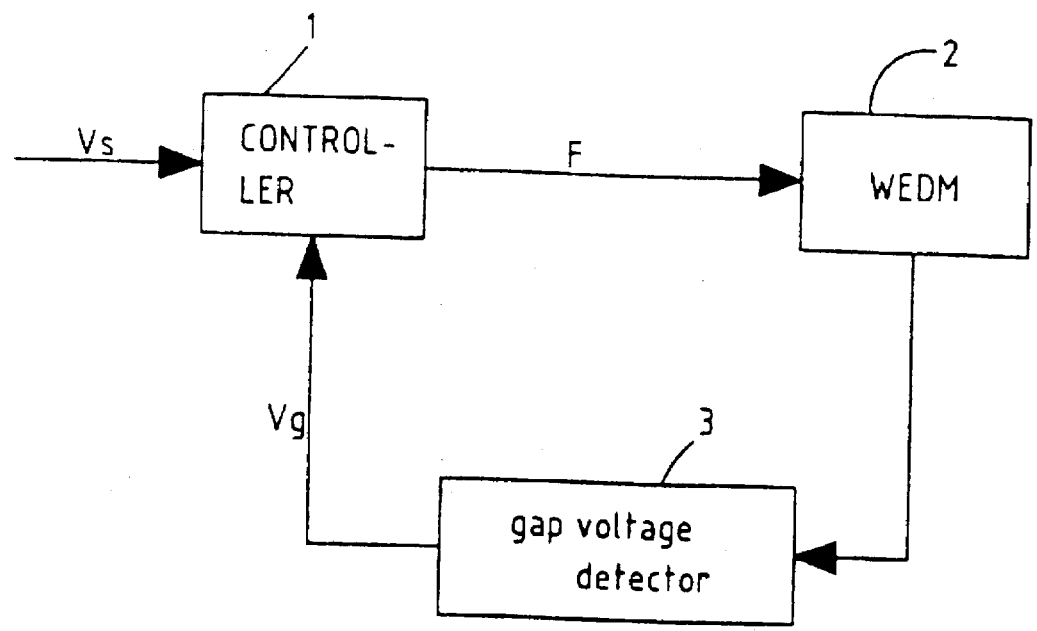
FIG. 1 shows a schematic block diagram of a prior art WEDM servo feedrate control apparatus.
Figure 2:
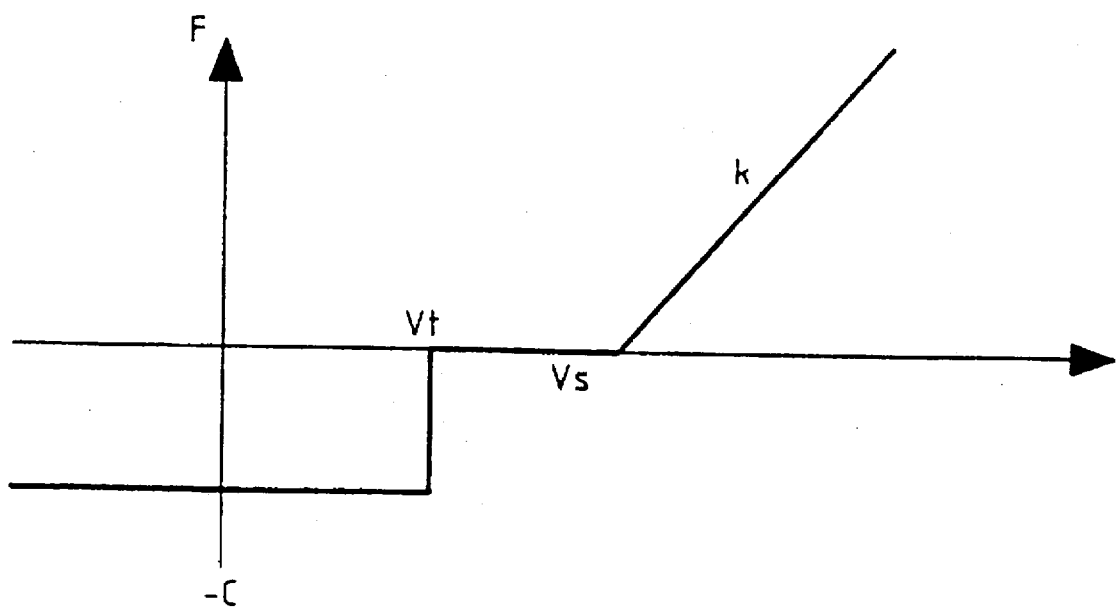
FIG. 2 shows a graph plotting the gap voltage ($V_g$) versus servo feedrate (F) characteristic of the prior art servo feedrate control of FIG. 1.

Compared the present invention with the prior art of FIG. 1, it can be seen that the present invention can adjust the feedrate adaptively in response to the current condition of the discharge gap based on a decision table of predetermined feedrate variation values. Through experiment, it has been proved that in the WEDM provided with the apparatus of the present invention the feedrate of the electric discharge is operated with maximum stability and efficiency.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A method of controlling feedrate for a wire-cutting electric discharging machine, comprising the following steps of:

(1) counting frequency of normal discharge ($f_{normal}$) and frequency of abnormal discharge ($f_{abnormal}$);

(2) calculating the value of stability percent (STB) according to the following equation:

$$STB = \left[ 1 - \frac{|arc\%[k] - arc\%[k-1]|}{arc\%[k]} \right] * 100\%$$

wherein [k] denotes the (k)th sampling, and $$arc\% = \frac{f_{abnormal}}{f_{normal} + f_{abnormal}}$$

but if STB<0, STB=0 is used;

(3) calculating the value of efficiency percent (EFF) according to the following equation:

$$EFF = \frac{f_{normal} * t_{off} + f_{abnormal} * t_{ab-off}}{\tau * 10^6} * 100\%$$

wherein $t_{off}$=idle period during normal discharge (unit: us),
$t_{ab-off}$=idle period during abnormal discharge (unit: us),
$\tau$=sampling period (unit: sec),
and $0<\tau\leq 2$;

(4) obtaining a value of feedrate variation $\Delta F\%$ selected from a decision table of predetermined values mapped by the STB and EFF values; and (5) adjusting current feedrate of the WEDM by a variation equal to the selected value of $\Delta F\%$.

2. A method as claimed in claim 1, wherein in said Step (2), the STB value is quantized into five levels: HIGH, INTERMEDIATE HIGH, INTERMEDIATE, INTERMEDIATE LOW, and LOW levels; and in said Step (3), the EFF value is quantized into five levels: HIGH, INTERMEDIATE HIGH, INTERMEDIATE, INTERMEDIATE LOW, and LOW levels.

3. A method as claimed in claim 1, wherein in said Step (4) the decision table consists of a total of 25 values of ΔF% each of which is uniquely mapped to by a combination of the STB and EFF values.

4. An apparatus for controlling feedrate for a wire-cutting electric discharging machine, comprising:

(1) means for counting frequency of normal discharge ($f_{normal}$) and frequency of abnormal discharge ($f_{abnormal}$);

(2) first arithmetic means for calculating for the value of stability percent (STB) in accordance with the following equation:

$$STB = \left[ 1 - \frac{|\text{arc} \% [k] - \text{arc} \% [k-1]|}{\text{arc} \% [k]} \right] * 100\%$$

wherein [k] denotes the (k)th sampling, and $$\text{arc} \% = \frac{f_{abnormal}}{f_{normal} + f_{abnormal}}$$

(3) second arithmetic means for calculating the value of efficiency percent (EFF) in accordance with the following equation:

$$EFF = \frac{f_{normal} * t_{off} + f_{abnormal} * t_{ab\text{-}off}}{\tau * 10^6} * 100\%$$

wherein $t_{off}$=idle period during normal discharge (unit: us),
$t_{ab\text{-}off}$=idle period during abnormal discharge (unit: us),
$\tau$=sampling period (unit: see), and
$0 < t \leq 2$;

(4) third arithmetic means for obtaining a value of feedrate variation ΔF% selected from a decision table of predetermined values mapped by a combination of the STB and EFF values; and (5) means for adjusting current feedrate of the WEDM by a variation equal to the selected value of ΔF%.

5. An apparatus as claimed in claim 4, wherein said first calculating means quantizes the STB value into five levels: HIGH, INTERMEDIATE HIGH, INTERMEDIATE, INTERMEDIATE LOW, and LOW levels; and said second calculating means quantizes the EFF value into five levels: HIGH, INTERMEDIATE HIGH, INTERMEDIATE, INTERMEDIATE LOW, and LOW levels.

6. An apparatus as claimed in claim 4, where the decision table in said third arithmetic means consists of a total of 25 values of ΔF% each of which is mapped to by a combination of the STB and EFF values.

* * * * *